(12) United States Patent
Azimi et al.

(10) Patent No.: US 9,739,411 B1
(45) Date of Patent: Aug. 22, 2017

(54) SYSTEM AND METHOD FOR TRAVERSING PIPES

(71) Applicant: The United States of America, as represented by the Administrator of the National Aeronautics and Space Administration, Washington, DC (US)

(72) Inventors: Shaun Azimi, Houston, TX (US); Darby Magruder, Dickinson, TX (US); Justin Ridley, Houston, TX (US); Anthony Lapp, Houston, TX (US); Jodi Graf, Seabrook, TX (US); Ross Pettinger, Friendswood, TX (US)

(73) Assignee: The United States of Americas as represented by the Administrator of the National Aeronautics and Space Administration, Washington, DC (US)

( * ) Notice: Subject to any disclaimer, the term of this patent is extended or adjusted under 35 U.S.C. 154(b) by 47 days.

(21) Appl. No.: 14/818,799

(22) Filed: Aug. 5, 2015

Related U.S. Application Data (60) Provisional application No. 62/034,114, filed on Aug. 6, 2014.

(51) Int. Cl.
*F16L 55/38* (2006.01)
*F17D 5/00* (2006.01)
(Continued)

(52) U.S. Cl.
CPC .............. *F16L 55/38* (2013.01); *B65G 51/04* (2013.01); *F16L 55/40* (2013.01); *F17D 5/00* (2013.01); *G01M 3/005* (2013.01)

(58) Field of Classification Search
CPC ......... F16L 55/38; B65G 51/04; B65G 51/08; G01M 3/005
(Continued)

(56) References Cited

U.S. PATENT DOCUMENTS 3,174,171 A * 3/1965 McDermon ............. F16L 55/46
137/268
4,244,296 A * 1/1981 Vertut ..................... B08B 9/049
104/138.2
(Continued)

FOREIGN PATENT DOCUMENTS

FR          2868148 A1    9/2005
WO      WO9503526 A1    2/1995
(Continued)

OTHER PUBLICATIONS

Gamechangeridea, Test-NASA Gamechanger, YouTube online Video, Published on Feb. 13, 2013, [retrieved on Feb. 13, 2017], retreived from <https://www.youtube.com/watch?v=ux7rKIWtYX0>.

*Primary Examiner* — Lisa Caputo
*Assistant Examiner* — Philip Cotey
(74) *Attorney, Agent, or Firm* — Theodore U. Ro (57) ABSTRACT

A system and method is provided for traversing inside one or more pipes. In an embodiment, a fluid is injected into the one or more pipes thereby promoting a fluid flow. An inspection device is deployed into the one or more pipes at least partially filled with a flowing fluid. The inspection device comprises a housing wherein the housing is designed to exploit the hydrokinetic effects associated with a fluid flow in one or more pipes as well as maneuver past a variety of pipe configurations. The inspection device may contain one or more sensors capable of performing a variety of inspection tasks.

8 Claims, 6 Drawing Sheets

(51) Int. Cl.
*F16L 55/40* (2006.01)
*B65G 51/04* (2006.01)
*G01M 3/00* (2006.01)

(58) Field of Classification Search
USPC .................................................. 73/865.8
See application file for complete search history.

(56) References Cited

U.S. PATENT DOCUMENTS

| | | | |
|---|---|---|---|
| 4,945,775 A | 8/1990 | Adams et al. | |
| 6,241,028 B1 | 6/2001 | Bijleveld et al. | |
| 6,553,322 B1 | 4/2003 | Ignagni | |
| 7,111,516 B2 | 9/2006 | Bazarov et al. | |
| 8,491,722 B2 | 7/2013 | Phipps | |
| 8,619,134 B2 | 12/2013 | Christ | |
| 2003/0183022 A1* | 10/2003 | Sapelnikov | F16L 55/28 73/865.8 |
| 2004/0112152 A1* | 6/2004 | Stout | F17D 5/00 73/865.8 |
| 2005/0005716 A1* | 1/2005 | Harris | G01M 3/18 73/865.8 |
| 2005/0172697 A1* | 8/2005 | Nozaki | G01M 3/005 73/12.01 |
| 2005/0172737 A1* | 8/2005 | Bond | F16L 55/46 73/865.8 |
| 2006/0005610 A1* | 1/2006 | Makogon | B08B 9/055 73/61.41 |
| 2006/0037659 A1* | 2/2006 | Gillam | F16L 55/134 138/97 |
| 2009/0078283 A1* | 3/2009 | Phipps | F16L 55/38 134/8 |
| 2010/0212747 A1* | 8/2010 | Harvey | F16L 55/38 137/1 |
| 2011/0036148 A1* | 2/2011 | Stubler | G01M 3/005 73/40.5 R |
| 2011/0100644 A1* | 5/2011 | Bowie | F16L 55/1283 166/374 |
| 2012/0291569 A1* | 11/2012 | Hill | F16L 55/40 73/865.8 |
| 2013/0291782 A1 | 11/2013 | Asada et al. | |
| 2013/0319540 A1* | 12/2013 | Hegner | F16L 55/16455 137/15.08 |
| 2013/0321613 A1* | 12/2013 | Hansen | H04N 7/18 348/84 |
| 2014/0107839 A1 | 4/2014 | Asada et al. | |
| 2015/0136012 A1 | 5/2015 | Williams | |

FOREIGN PATENT DOCUMENTS

| | | |
|---|---|---|
| WO | WO9950586 | 10/1999 |
| WO | WO2006078873 A9 | 7/2006 |
| WO | WO2013157978 A1 | 10/2013 |

* cited by examiner

SYSTEM AND METHOD FOR TRAVERSING PIPES

CROSS REFERENCE TO RELATED APPLICATION

This application claims the benefit of a related U.S. Provisional Application Ser. No. 62/034,114 filed Aug. 6, 2014, which is incorporated by reference herein.

ORIGIN OF THE INVENTION

The invention described herein was made in the performance of work under a NASA contract and is subject to the provisions of Section 305 of the National Aeronautics and Space Act, Public Law 111-314, §3 (124 Stat. 3330, 51 U.S.C. Chapter 201).

FIELD OF THE INVENTION

The present invention relates to a new and improved system and method for traversing inside one or more pipes at least partially filled with a flowing fluid.

BACKGROUND OF THE INVENTION

Oil and natural gas production from offshore platforms represent a substantive component of overall global oil and natural gas production. Such offshore platforms exist in many parts of the world including the North Sea off the coast of northwest Europe, the Gulf of Mexico, and the coast of Brazil, just to name a few. The trend since the early 1930s has been to extend offshore platforms into deeper waters. The typical platforms of the late 1940s were erected in approximately 6 meters or 19.5 feet of water and weighed about 1,100 metric tons or 1,200 tons. Today, platforms can be effected in water over 300 meters or 1000-1,200 feet deep and weigh more than 47,000 metric tons or 52,000 tons.

As these platforms age, produce less oil and natural gas, and/or when the economics do not support continued operations, decommissioning and dismantling these platforms and associated infrastructure present a significant engineering task whereby safety and environmental considerations become very important. Wood Mackenzie, an industry consulting firm in Scotland, "forecasts that the oil industry will spend £15 billion over the next decade on decommissioning in Britain, and that by the early 2020s, annual costs for dismantling fields may exceed new investment." See Stanley Reed, *An Expensive Sunset for the Brent Oil Field*, N.Y. Times, Feb. 18, 2015.

These platforms are generally comprised of significant infrastructure below the water level. For example, a platform may be constructed on top of a stable concrete base comprising a plurality of very large tanks. It is not uncommon for a platform to utilize one or more clusters of very large tanks, commonly referred to as "cells," used for oil storage and/or separation of oil. Access into these tanks may be achieved through the existing interconnected pipes, thereby avoiding access methods which require boring through the structure of the cell and ultimately impacting cell integrity. There is a need to traverse one or more pipes to gain access to the cells for inspection purposes in order to assess various properties of the cells such as, for example, the composition of fluid inside the cells, structural integrity, mapping of the interior of the cells, and sediment accumulation and constituency. Such information derived from a proper inspection of the cells will play an important part in determining if such cells can remain in place on the subsea floor or will have to be removed. The cost differential between these two options is substantial.

As subsea surface operations increase, it is reasonable to assume that a need will exist for inspection of subsea pipes and structures connected to the pipes. Further, as the use of pipes exist in various applications such as pipelines, industrial plants, sewage systems, etc., there will be a need for inspection of said pipes and structures connected thereto.

The present invention provides a means for traversing one or more pipes at least partially filled with a flowing fluid or for subsequently gaining access to a tank at least partially filled with a fluid.

SUMMARY OF THE INVENTION

It is an object of the present invention to provide a device capable of traversing one or more pipes at least partially containing or filled with a flowing fluid.

In accordance with an embodiment of the present invention, a system capable of traversing inside one or more pipes having a predetermined minimum interior diameter is comprised of: a housing having a maximum outer diameter, forward section, and an aft section; a means for flowing a fluid into the one or more pipes at a predetermined flow rate, wherein the housing's maximum outer diameter is less than the one or more pipes' predetermined minimum interior diameter, wherein the housing's maximum outer diameter is in a predetermined proportional relationship with the one or more pipes' predetermined minimum interior diameter, wherein the predetermined proportional relationship permits the fluid to flow around the housing in such a manner to increase the mixture's velocity in proximate relationship to the housing and subsequently decreasing a second pressure in proximate relation to the housing's forward section to a one or more predetermined value, wherein the predetermined proportional relationship in combination with the predetermined flow rate promotes an increase in a first pressure in proximate relation to the aft section, and wherein the predetermined flow rate enables the fluid to effectively apply a predetermined force on the housing, wherein the combination of the resultant differential in the first and second pressures and predetermined force results in forward motion of the housing inside the one or more pipes.

In accordance with another embodiment of the present invention, a method for moving a device inside one or more pipes is comprised of the following steps: providing the one or more pipes having a predetermined minimum interior diameter and one or more interior diameters; providing the device comprised of a housing having a maximum outer diameter and a forward section, wherein the housing's maximum outer diameter is less than the one or more pipes' predetermined minimum interior diameter and one or more interior diameters, wherein the housing's maximum outer diameter is in a predetermined proportional relationship with the one or more pipes' predetermined minimum interior diameter and one or more interior diameters; injecting a fluid into the one or more pipes at a predetermined flow rate thereby creating a fluid flow, wherein the predetermined flow rate is capable of effectively applying a predetermined force on the device; deploying the device inside the one or more pipes; and invoking a pressure differential of predetermined value between a first pressure upstream of the device and second pressure downstream of the device wherein the first pressure is greater than the second pressure and wherein the step of invoking the pressure differential is accomplished through a combination of the predetermined proportional relationship and the predetermined flow rate thereby permitting the fluid to flow around the housing at a predetermined second velocity subsequently decreasing the second pressure, wherein the combination of the pressure differential and predetermined force results in moving the device inside the one or more pipes.

BRIEF DESCRIPTION OF THE DRAWINGS

The invention will be more readily understood with reference to the following detailed description, when taken in conjunction with the accompanying drawings, wherein.

DETAILED DESCRIPTION OF THE INVENTION

Figures 1A, 1B:
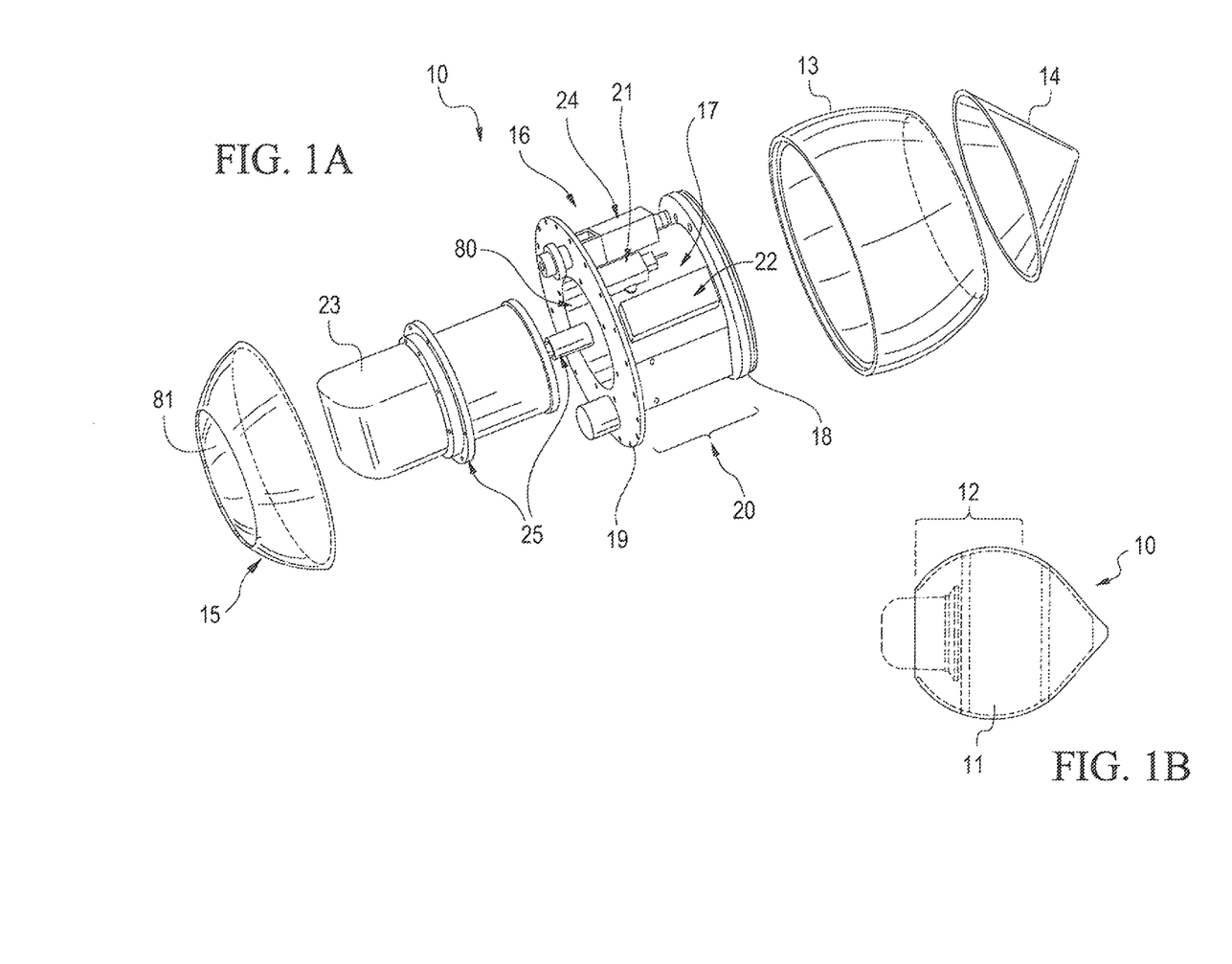
FIG. 1A is a perspective, exploded view of an embodiment of an inspection device having a substantially spherical or ellipsoidal section and a substantially conical aft section in accordance with an embodiment of the present invention
FIG. 1B is a perspective view of an inspection device.

With initial reference to FIGS. 1A and 1B, an embodiment of an inspection device (10) will now be described. As seen in FIGS. 1A and 1B, an inspection device (10) includes a housing (11) which may be comprised of a forward section (12), main body (13), and aft section (14). In an embodiment, the main body (13) may be substantially spherical or ellipsoidal in shape and the aft section (14) may be substantially conical in shape wherein the resultant shape of the housing (11) is a substantially teardrop shape. The shape(s) of the forward section (12), main body (13) aft section (14), and cap (15) may each be any shape meeting the purposes and operational principles of the invention as well as varied, changed out, removed entirely, or any combination to, for example, minimize mechanical interference with the one or more pipes (26) during deployment and retrieval of the inspection device (10) or for hydrokinetic effects. For purposes herein, a "pipe" is defined as a hollow cylinder or tube used to conduct one or more liquids, gases, finely divided solids, or any combination. In an embodiment, the one or more pipes (26) may comprise a plurality of interconnected pipes (26). The one or more pipes (26) may comprise one or more pipe connections such as a tee fitting (91), elbow fitting, coupling, etc. In an embodiment, the aft section (14) may be comprised of one or more pieces and may comprise an aperture. Further, one or more sensors (21) such as, for example, a camera may be attached to the rack (16) and/or aft section (14) through the aperture. The camera may be utilized to transmit a live video feed or one or more still images for monitoring by one or more system users to aid in avoiding potential hazards such as obstructions, openings, etc. The camera may comprise a lighted video camera. Still further, the one or more sensors (21) may comprise a variety of sensors such as, for example, motion sensing instruments, video camera, still image camera, inertial measuring unit, LIDAR, core sampler, sample retrieval device, etc. or any combination. The dimensions of the housing (11) is at least partially dependent on the interior dimensions of the one or more pipes wherein the inspection device is scheduled to traverse. For example, when the minimum diameter of the one or more pipes is known, the housing's maximum outer diameter (83) is designed to be a value less than the pipes' minimum interior diameter. The housing's maximum outer diameter (83) may be selected based on theoretical or actual hydrokinetic effects of a fluid flow and the housing's maximum outer diameter (83) in structural proportional relationship with the one or more pipes' minimum interior diameter as well as one or more interior diameters (85). Other considerations such as potential sediment formation in the one or more pipes (26) or other potential obstructions may be factored into a selection of the housing's maximum outer diameter (83) as well as overall shape. The forward section (12) may be comprised of a cap (15) and at least a partial area of the main body (13). In an embodiment, the cap (15) may be substantially spherical in shape and may form a partial dome wherein the cap (15) may be in sealable connection with the main body (13) and the main body (13) may be in sealable connection with the aft section (14). In an embodiment, the cap (15) may be comprised of a cut-out or gap (81). The inspection device (10) may be further comprised of a rack (16). As seen in FIG. 1A, the rack (16) may be comprised of an inner core (17) substantially cylindrical in shape with two annular rings (18, 19) on each end of the inner core (17). It is noted that the particular shape of the rack (16) may be any shape that is compatible with the shape of the housing (11). In the embodiment illustrated in FIG. 1A, the two annular rings (18, 19) may have different or the same diameters in relation to each other wherein each ring diameter is predefined in accordance with the shape and dimensions of the housing (11). Further, the two annular rings (18, 19) in structural relationship with the inner core (17) may form a flange thereby creating a spacing (20) whereby the spacing (20) between the annular rings (18,19) and outward from the inner core's (17) external surface may be used to accommodate one or more sensors (21), one or more institutional components (22), or any combination. The one or more institutional components (22) may support the operations of the one or more sensors or the operations of the overall inspection device (10) and the one or more institutional components (22) may comprise, for example, a video encoder, video multiplexer, Ethernet converter, central processing unit, power controller, power source, lights, connectors, wires, etc. In an embodiment, the aft section (14) may accommodate one or more institutional components (22) in addition to one or more sensors (21) as discussed above. Still further, the embodiment illustrated in FIG. 1A includes a sonar (23), an integrated stepper motor (24), and one or more connectors (25) all stored in the interior of the inner core (17). The one or more connectors (25) may be mechanical, electrical, electronic, etc. Various commercial-off-the-shelf sonar systems can be employed. The sonar (23) may be a 2D or 3D imaging system. However, it is noted that inspection device (10) is designed to be modular in a multi-dimensional sense. For example, the interior of the inner core (17) can accommodate different instrumentation or sensors such as a "plug and play" module capable of collecting samples or retrieving a core sample. Samples may be comprised of any solid, fluid, or even gas that may exist in proximity to the inspection device such as sediment, oil, etc. In addition, the housing (11) is capable of disassembly in the field thereby enabling a change or maintenance of the one or more of sensors (21) or one or more institutional components (22). Further, the main body (13), aft section (14), or cap (15) of the housing (11) may be changed out to effectively change the housing's (11) overall shape for any purpose such as mechanical or hydrokinetic purposes. The sonar (23) may be one or more 3D or 2D imaging sonars and may protrude through the gap (81). In another embodiment, other "plug and play" sensor modules may protrude through the gap (81) such as a sample collector, core sample retriever, or forward facing camera. The integrated stepper motor (24) may include one or more motors, drivers, controllers, etc. or any combination. The one or more connectors (25) may be bushings, clamps, gears, bolts, nuts, etc. or any combination.

Figure 2:
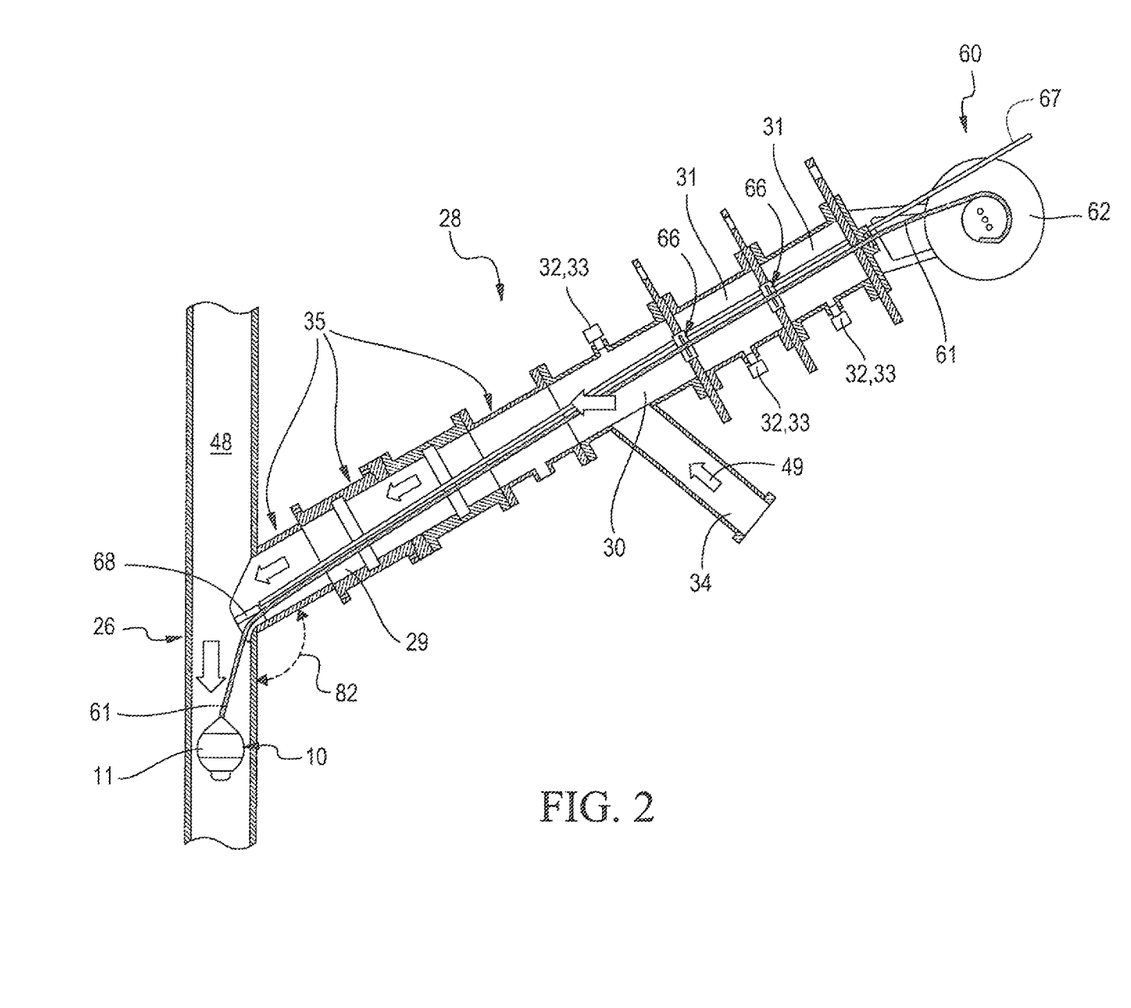
FIG. 2 is a perspective view of an inspection system comprising an embodiment of an inspection device whereby the device is traversing through one or more pipes.
Figure 3:
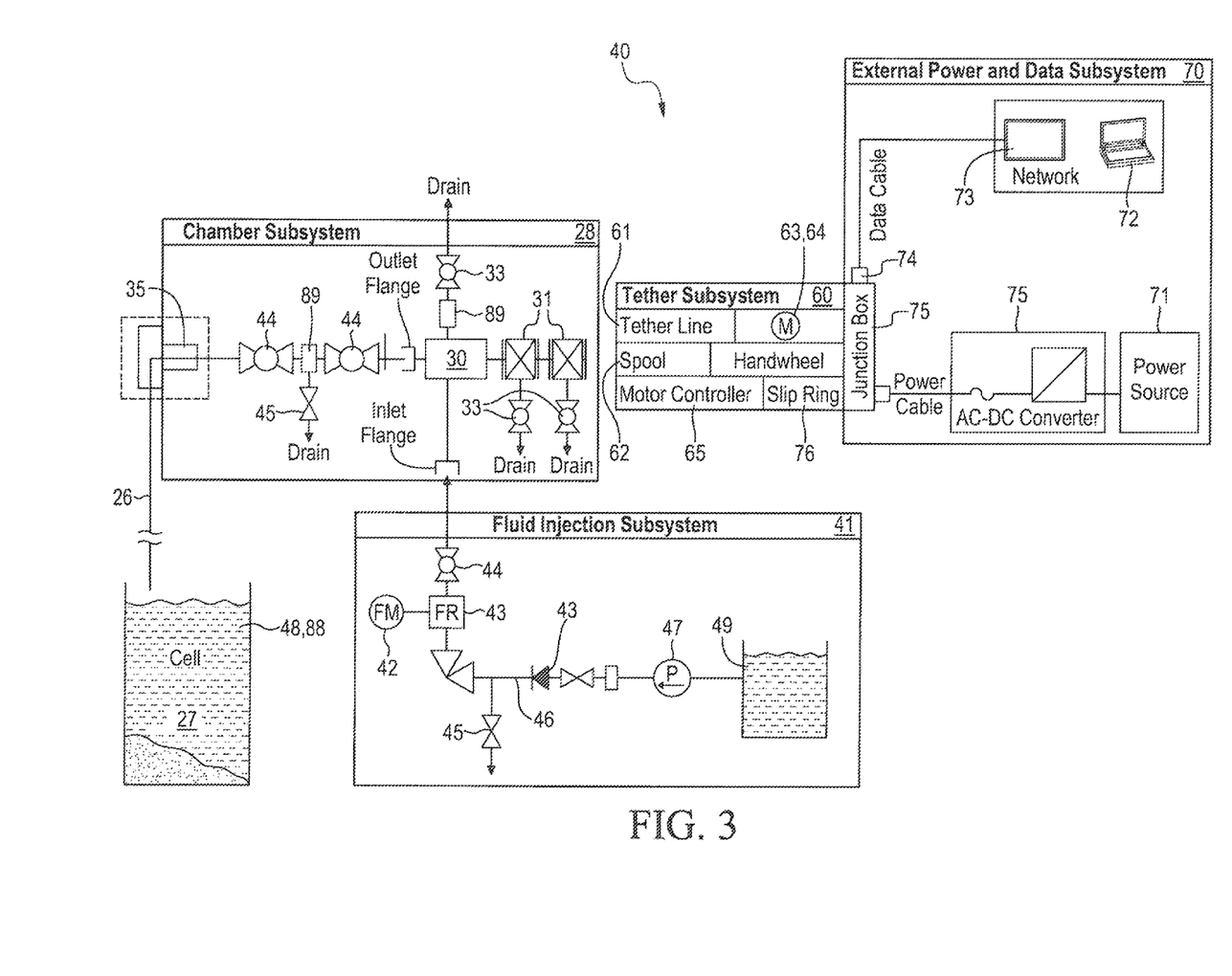
FIG. 3 is a schematic diagram of the components of an inspection system comprising an embodiment of an inspection device.
Figure 4:
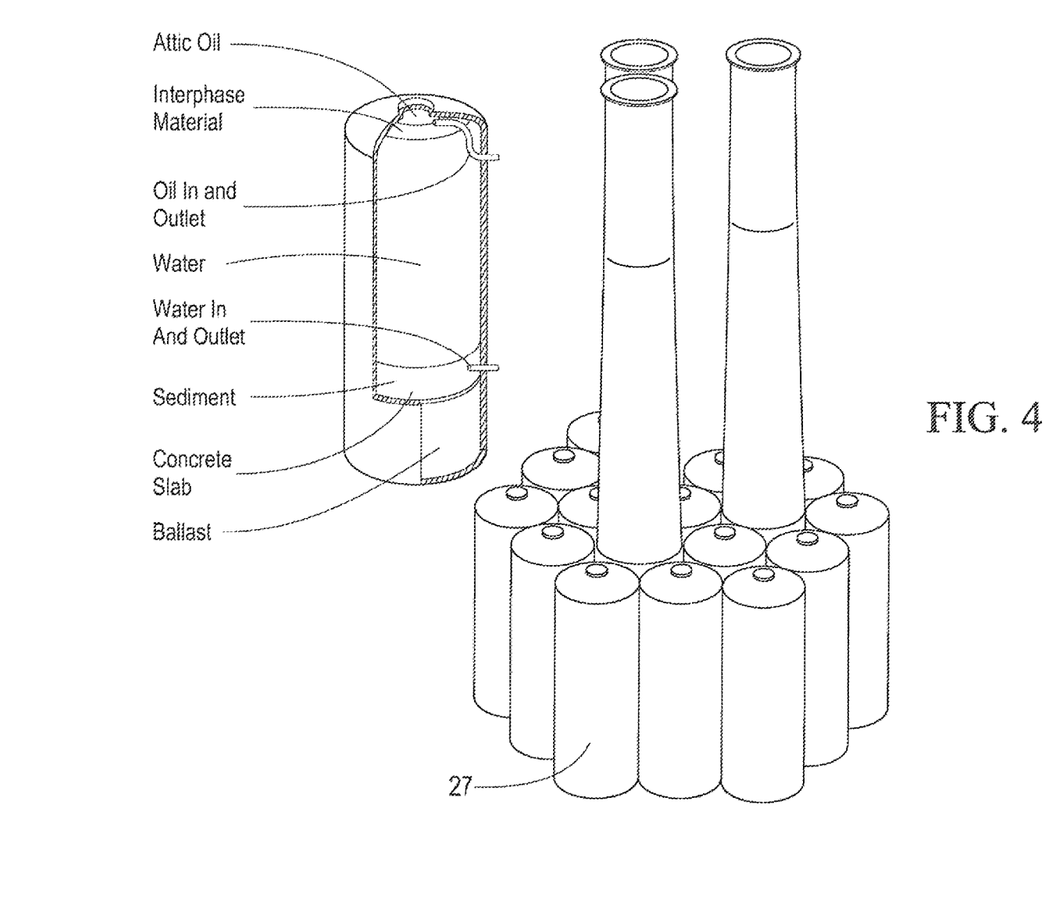
FIG. 4 is a partially broken away view of a system of storage tanks or cells associated with an offshore drilling platform.
Figure 5:
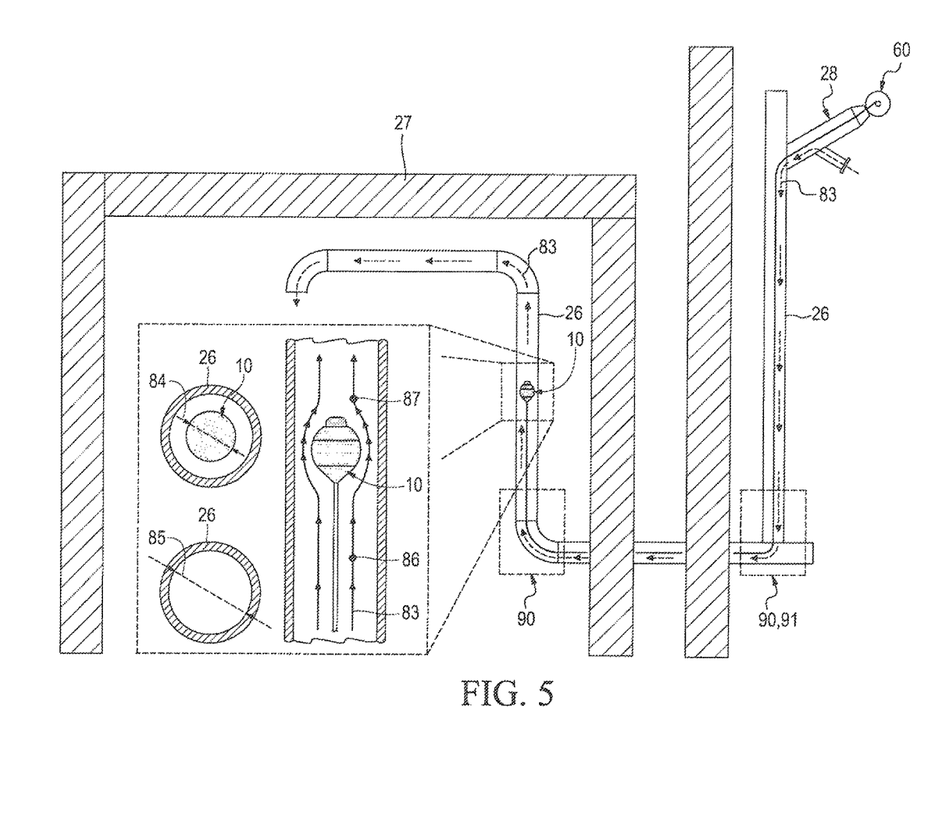
FIG. 5 is an embodiment of an inspection device as it traverses inside a plurality of interconnected pipes with particular reference to a cut-away and associated annulus view of an inspection device inside the interior volume of a pipe with fluid flow.

With specific reference to FIG. 3 and additional reference to FIGS. 2 and 5, a system (40) for traversing one or more pipes is illustrated. In this embodiment, the system (40) may be comprised of the inspection device (10), a chamber subsystem (28), a tether subsystem (60), an external power and data subsystem (70), a fluid injection subsystem (41), associated software (100) such as for example, control and monitoring software, or any combination. As illustrated in FIG. 5, the Inspection device (10) is illustrated as traversing through a plurality of interconnected pipes (26) at least partially containing a first fluid (48) and accessing a tank or cell (27) at least partially containing the first fluid (48), a third fluid (88), or both. The first and third fluids (48, 88) may be known or unknown. The first, second, or third fluids may be of homogeneous or heterogeneous composition. In an embodiment, the first and second fluids are substantially the same compositions. In another embodiment, the second and third fluids are substantially the same compositions. As illustrated in FIG. 2, the inspection device (10) is launched from a chamber subsystem (28). The chamber subsystem (28) may be connected to the plurality of interconnected pipes (26) and comprised of one or more compartments (29). In an embodiment, the one or more compartments (29) comprise a plurality of compartments (29) which is further comprised of a stowage and launching compartment (30) connected to one or more adapter compartments (35) wherein one of the adapter compartments (35) is connected to the plurality of interconnected pipes (26). The adapter compartments (35) may comprise one or more valves (44), one or more pressure gauges (89), one or more drains (45), or any combination which may provide a means for observing a fill line pressure, a bleed line pressure, or perform pressure integrity operations. The inspection device (10) can be launched from the stowage and launching compartment (30) into the plurality of interconnected pipes (26) by traversing through the one or more adapter compartments (35). The one or more compartments (29) may further comprise one or more reservoir compartments (31). In an embodiment, the chamber subsystem (28) may be comprised of a stowage and launching compartment (30) comprised of one or more outlets (32) wherein the stowage and launch compartment (30) is connected to two reservoir compartments (31) wherein each of the two reservoir compartments (31) is comprised of an outlet (32) and one or more glands (66). An outlet (32) may be comprised of a ball valve drain port (33). In an embodiment, the stowage and launching compartment (30) may comprise one or more inlets (34). The fluid injection subsystem (41) may be in operable connection with at least one of the one or more inlets (34).

With additional reference to FIG. 3, the fluid injection subsystem (41) may be comprised of one or more flow meters (42), one or more flow regulators (43), one or more valves (44), one or more drains (45), one or more lines (46), and one or more pumps (47). In another embodiment, the necessary pressure to inject a predetermined second fluid (49) may result from a natural pressure differential between the surrounding environment and the plurality of interconnected pipes (26) whereby the one or more pumps (47) may not be required. The fluid injection subsystem (41) may be connected to a fluid source containing a predetermined second fluid (49). In an embodiment, when the system (40) is in operation, the predetermined second fluid (49) is injected into the stowage and launching compartment (30) or the one or more adapter compartments (35) by the fluid injection subsystem (41). In another embodiment (not shown), the fluid injection subsystem (41) may be connected to plurality of interconnected pipes (26) upstream relative to where the chamber subsystem (28) is connected to the plurality of interconnected pipes (26). For purposes herein, "upstream" is defined as the direction opposite to the fluid flow created by the fluid injection system (41). And, "downstream" is defined as the direction of the fluid flow created by the fluid injection system (41). In an embodiment, the chamber subsystem (28) is attached to the plurality of interconnected pipes (26) at a predetermined angle (82). The predetermined angle (82) can be selected to enable the inspection device (10) to utilize gravitational forces as a means to initially launch itself into the plurality of interconnected pipes (26) before the flow of the predetermined second fluid (49) applies a fluid force on the inspection device (10). Further, in operation, the two reservoir compartments (31) and associated glands (66) can serve as the primary barrier and seal against potential excess escaping fluids from the stowage and launching compartment (30). In this embodiment, should excess escaping fluids enter a reservoir compartment (31) one or both ball valves (33) would be capable of opening to allow the excess escaping fluids to be channeled away from the system (40). The fluid injection subsystem (41), individual components thereof, or combination of components thereof represent a means for flowing a predetermined second fluid (48) into the plurality of interconnected pipes (26) at a predetermined flow rate (83).

With continued reference to FIG. 2, an embodiment of a tether subsystem (60) is illustrated. In an embodiment, the tether subsystem (60) may be comprised of a tether line (61), a spool (62), a means for deployment and retrieval (63) such as for example, a motor (64) and a motor controller (65) or hand crank/wheel. In an embodiment, the spool (62) rotates relative to the frame of the tether subsystem (60), which attaches rigidly to the chamber subsystem (28). The rotation of the spool allows the tether line (61) to be reeled in and out using the means for deployment and retrieval (63). In an embodiment, the tether line (61) can serve multiple purposes such as a physical link to the inspection device (10), which can be used in a retrieval operation of the inspection device (10). Another potential purpose for the tether line (61) is to function as a transmission line wherein the tether line (61) can be used to supply power, data, or both to the inspection device (10). In an embodiment, the tether subsystem (60) is connected to the chamber subsystem (28). Further, in an embodiment, the tether line (61) is physically connected to the aft section (14) of the inspection device (10) and is in operable connectivity with the one or more sensors (21), one or more institutional components (22), or any combination. In an embodiment, the tether line (61) is threaded through the chamber subsystem (28) through one or more glands (66). In an embodiment, a gland (66) will be incorporated in one or more interfaces associated with each reservoir compartment (31). In an embodiment, the tether line (61) passes through the one or more glands (66) which minimize the flow of fluids from the stowage and launching compartment (30) into the reservoir compartment(s) (31). In an embodiment, the one or more glands (66) are substantially toroidal in shape comprising a substantially smooth inner surface with an inner diameter larger than the nominal outer diameter of the tether line (61). Additionally, in an embodiment, the tether line (61) also passes through a tether protector (68), which is comprised of a substantially cylindrical hollow sleeve having a substantially smooth and substantially curved inner surface. In an embodiment, the tether protector (68) may be positioned by means of an attached rod (67) to cover a substantially rough or substantially sharp edge at a predetermined position within the plurality of interconnected pipes (26), thereby minimizing friction and damage to the tether line (61). The tether subsystem (60) is further capable of braking the tether line's deployment.

With reference to FIG. 3, the external power and data subsystem (70) is comprised of one or more power sources (71), one or more central processing units (72), one or more networking components (73), a plurality of connectors (74), a slip ring (76), and one or more interface components (75). In an embodiment, a central processing unit (72) hosts the ground station application (101). In an embodiment, the central processing unit (72) is in operable connectivity with the inspection device (10) via, inter alia, the networking components (73), connectors (74), interface components (75), and the slip ring (76). In an embodiment, a main power source (71) is converted to a lower voltage by one of the one or more interface components (75), the output of which is connected to the inspection device (10) via, inter alia, connectors (74), interface components (75), and a slip ring (76). The slip ring (76) allows the power and data connections to cross from the fixed frame of tether subsystem (60) to the rotating spool (62) and tether line (61). The networking components (73) use a suitable data transmission protocol to allow data communication over a sufficient distance to allow the central processing unit (72) to be located in a safe area and so that sufficient length of tether line (61) can be deployed to allow the inspection device (10) to reach the cell (27).

Figure 6:
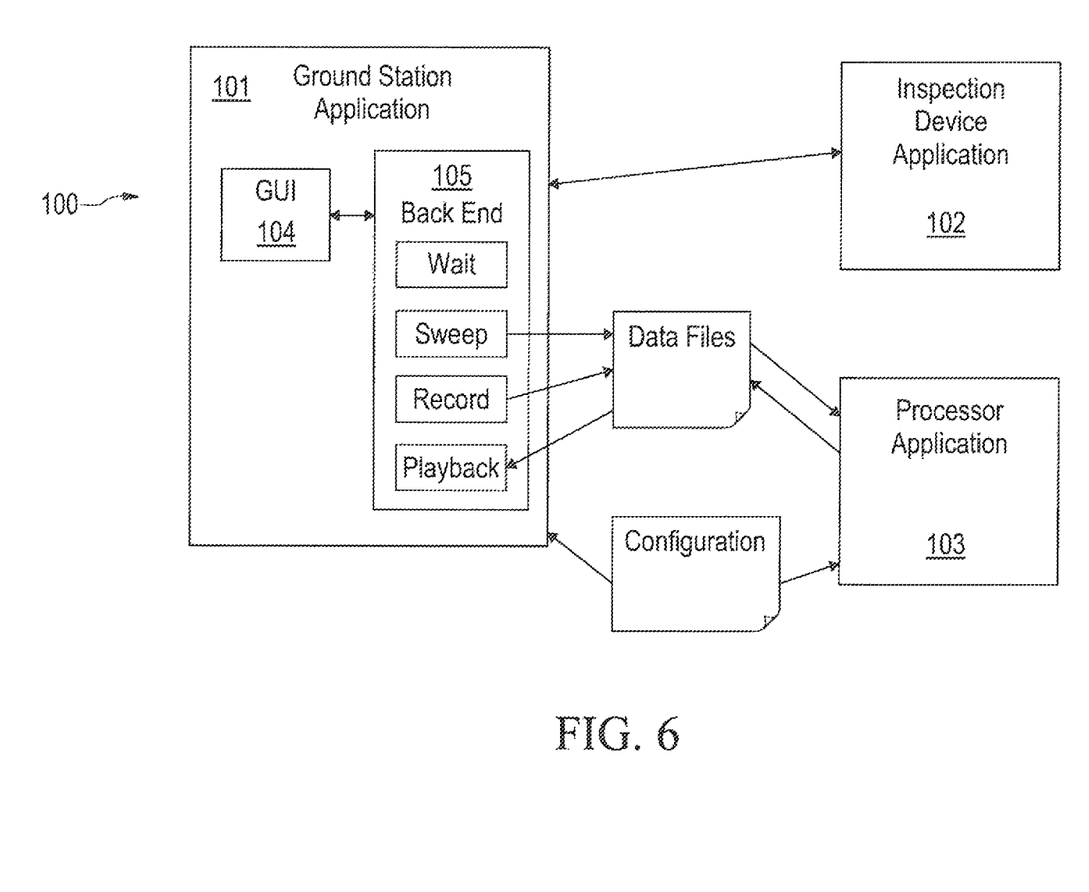
FIG. 6 is a functional diagrammatic representation of system software.

With reference to FIG. 6, the system's (40) software (100) is comprised of a plurality of applications. In an embodiment, the software (100) is comprised of the following three applications: a ground station application (101), an inspection device application (102), and a processor application (103). In an embodiment, the ground station application (101) may be an interface for controlling the inspection device (10), for collection of input data, and for replaying input data. The ground station application (101) may serve as a means for controlling and monitoring the inspection device (10) during operation and may be comprised of a graphical user interface (104) and a back-end communications component (105). In an embodiment, the graphical user interface (104) can be flexible by providing users a plurality of different views of input data from the inspection device (10). In addition, the graphical user interface (104) may be comprised of a plurality of panels for configuring and controlling the inspection device (10) such as for example: a camera view panel, a sonar view panel, a three-dimensional visualization panel, a three-dimensional model of an inertial measuring unit illustrating the orientation of the inspection device (10), a control panel to generate commands to the inspection device (10), etc. Specifically, in an embodiment, the ground station application (101) is capable of sending commands to the inspection device application (102); receiving input data from the one or more sensors (21); and replaying input data. Replaying input data allows users to quickly review the input data, confirm that the input data has been effectively recorded, and to aid in troubleshooting should any issues occur during deployment, operations, or retrieval of the inspection device (10). In an embodiment, the inspection device application (102) runs locally on an embedded central processing unit embedded in the inspection device (10) and interacts with the inspection device (10) as well as communicates with the ground station application (101). In an embodiment, the inspection device application (102) may be used to control the integrated stepper motor (24) which may be used to rotate the sonar's (23) head; to select one or more cameras to transmit images back to the ground station application (101); or reset power on at least one of the one or more sensors (21) or one or more institutional components (26). In another embodiment, the Inspection device application (102) collects data from the at least one of the one or more sensors (21) or one or more institutional components (26). For example, if the one or more sensors (21) comprise an inertial measurement unit (IMU), IMU data are collected and repackaged for eventual transmission to the ground station application (101). Other examples include collecting temperature data, sonar data, and camera data for repacking and eventual transmission to the ground station application (101). In an embodiment, the processor application may be utilized for post-processing of the input data. As an example, a post-processing task would be to generate a three-dimensional model of the interior of a cell. In an embodiment, a two-dimensional sonar is embedded in the inspection device (10) and the processor application converts the two-dimensional input data into a three-dimensional image. As another example, IMU data and sonar data are used to individually produce 3D maps for comparison/evaluation purposes.

With reference to the embodiment disclosed in FIGS. 2, 3, and 5, the operation of the system (40) for traversing one or more pipes will now be further described. The inspection device (10) is initially stowed in the chamber subsystem (28) and specifically, in the stowage and launching compartment (30). As discussed supra, the chamber subsystem (28) may be installed and connected to the one or more pipes (26) where, in an embodiment, the one or more pipes comprise a plurality of interconnected pipes (26). Before injection of a predetermined fluid into the one or more pipes or plurality of interconnected pipes (26), the pipe(s) (26) may or may not be at least partially filled with a fluid. Prelaunch operations may include energizing the inspection device (10) and powering up at least one of the one or more sensors (21) as well as checking and confirming the status of the inspection device (10) and overall system (40). The fluid injection subsystem (41) may be activated whereby a predetermined fluid is effectively injected into the plurality of interconnected pipes (26) at a predetermined flow rate (83) thereby imparting a predetermined fluid force on the inspection device (10). As an example, the predetermined fluid may be any fluid such as the first fluid (48) (if known), second fluid (49), third fluid (88) (if known), or any combination. The one or more pumps (47) in combination with the one or more flow regulators (43) may be utilized to inject the predetermined second fluid (49) at the predetermined flow rate (83). In another embodiment, the pressure differential between the surrounding environmental pressure and interior pressure of the plurality of interconnected pipes (26) in combination with the one or more flow regulators (43) may be utilized to inject the predetermined second fluid (49) at a predetermined flow rate (83). In this embodiment, the one or more pumps (47) are not utilized. Monitoring of the predetermined flow rate (83) may be accomplished in part by the one or more flow meters (42). In an embodiment, the predetermined second fluid (49) is injected in the chamber subsystem (28) and more specifically, in the stowage and launching compartment (30). In another embodiment, the predetermined second fluid (49) is injected upstream of the interface between the chamber subsystem (28) and plurality of interconnected pipes (26). In an embodiment, one or more drains (45) connected to the stowage and launching compartment (30) are closed during operation. As the predetermined second fluid (49) flows through the one or more adapter compartments (35), a combination of the one or more valves (44) and one or more pressure gauges (89) in operable connectivity with the one or more adapter compartments (35) and/or stowage and launching compartment (30) provide a means for: (A) observing a fill line pressure when one of the one or more valves (44) is open; (B) bleeding down pressure trapped between two of the one or more valves (44); and (C) performing a pressure integrity check to ensure that at least one of the one or more valves (44) is not leaking when closed. Further, in an embodiment, two of the one or more valves (44) and one or more pressure gauges (89) associated with the one or more adapter compartments (35) and/or stowage and launching compartment (30) may be utilized to monitor the pressure in the chamber subsystem (28) and to bleed off trapped pressure once the system (40) is isolated (i.e., during shut down operations). As the inspection device (10) is launched into the one or more adapter compartments (35) and plurality of interconnected pipes (26), fluid forces from the flow of the predetermined second fluid (49) generated by the fluid injection subsystem (41) start to take effect on the inspection device (10). The tether subsystem (60) gradually unwinds the tether line (61) as necessary such as to minimize any opposing forces relative to any gravitational and fluid forces acting in a downstream direction of the inspection device (10). In an embodiment, the one or more glands (66) allow the tether line (61) to unwind with minimal resistance, while minimizing the leak rate of any fluid (first and/or second) into the one or more reservoir compartments (31). In an embodiment, monitoring and changing the rate of unwinding the tether line (61) may take place. The winding and unwinding of the tether line (61) from the spool (62) may be manually, mechanically, or automatically accomplished by a means for deployment and retrieval (63). In an embodiment, the tether line (61) may be utilized to supply power, serve as a transmission line to continuously transmit data to and from the inspection device (10), or both. In an embodiment, the external power and data subsystem (70) is in operable connectivity with the one or more sensors (21), the one or more institutional components (22), or any combination. In an embodiment, the tether line (61) represents a means for the external power and data subsystem (70) to be in continuous operable connectivity with at least one of the one or more sensors (21) and one or more institutional components (22). In an embodiment, as the inspection device (10) travels through the plurality of interconnected pipes (26), at least one of the one or more sensors (21), the one or more institutional components (22), or any combination may be activated for purposes of inspection of the plurality of interconnected pipes (26). At least one designated user can be responsible for control and monitoring operations. The one or more users may utilize the external power and data subsystem (70) and software (100) described supra to perform said control and monitoring operations.

With particular reference to FIG. 5, the fluid flow promoted by the flow injection subsystem (41) in combination with the predetermined shape (for example, a substantially spherical or ellipsoidal main body (13) in combination with a substantially conical aft section (14)) of the inspection device's housing (11) and the housing's maximum outer diameter (84) in proportional annulus structural relationship with the interior diameter (85) of the plurality of interconnected pipes (26) promotes the flow of a mixture of the first and second fluids (48, 49) around the housing (11) to increase in mixture's velocity and turbulence, subsequently decreasing pressure to one or more predetermined values in proximate relation to the housing's forward section or downstream relative to the housing's forward section. Due in part to the hydrokinetic effects of the fluid flow promoted by the flow injection subsystem (41) in combination with the housing's (11) shape in proportional relationship with the one or more interior diameters (85) of the plurality of interconnected pipes (26), the inspection device (10) may be propelled through the plurality of interconnected pipes (26) comprised of one or more turns or one or more areas whereby the inspection device (10) must traverse vertical ascents. The inspection device (10) is illustrated in FIG. 5 as ascending a vertical portion of the plurality of interconnected pipes (26). The cut-away view in FIG. 5 illustrates the interaction between the housing's (11) maximum outer diameter (84) in annulus proportional relationship with an interior diameter (85) of the plurality of interconnected pipes (26). Due in part to the reduction in space promoted by the housing's (11) maximum outer diameter (83) as the inspection device (10) moves through the plurality of interconnected pipes (26) and the predetermined flow rate (83), a first pressure at a first point (86) in proximate relationship upstream of the inspection device increases and becomes greater than a second pressure at a second point (87) in proximate relationship downstream of the inspection device (10). The second pressure at the second point is also, in part, affected by the creation of a vortex and an increase in velocity of a mixture of the first and second fluids as the mixture flows past the housing's (11) maximum outer diameter downstream of the inspection device's (10) current position in the plurality of interconnected pipes (26). This resultant pressure differential, for example, between the first point (86) and second point (87) is a contributing factor in propelling the inspection device (10) through the plurality of interconnected pipes (26) comprised of one or more turns (90) or one or more areas whereby the inspection device (10) must traverse vertical ascents. In an embodiment, the one or more turns may comprise one or more pipe fittings such as one or more tee fittings (91) or one or more elbow fittings. As used in herein, a tee fitting (91) is a three-way fitting shaped like the letter "T" and comprised of a crosspiece section analogous to the top of the letter "T" and a second section set at a substantially right angle in relationship with the crosspiece section. In an embodiment, the housing's (11) forward section (12) is substantially ellipsoidal in shape, aft section (14) is substantially conical in shape, and the housing is substantially teardrop in shape, wherein the ellipsoidal shape, conical shape, teardrop shape, housing's length (which can be selected based on the interior diameter of the crosspiece of the tee fitting), predetermined flow rate, or any combination comprise a means for the inspection device to navigate and traverse the one or more tee fittings (91) and continue to traverse the plurality of interconnected pipes (26). In an embodiment, the housing (11) enters a tee fitting (91) through its second section and may physically engage the interior of the crosspiece section. In another embodiment, the inlet of the tee fitting (91) is located in the crosspiece section and the outlet is located in its second section. In this embodiment, the housing (11) enters the tee fitting (91) via the crosspiece section and the tether line (61) may be wound (retracted) and unwound in one or more cycles to aid in the alignment of the housing (11) maneuvering from the crosspiece section into the second section of the tee fitting (91). The fluid flow resulting from the predetermined flow rate (83) promotes the housing (11) to turn in the direction of the fluid flow thereby executing a substantially 90 degree turn inside the tee fitting (91). In an embodiment, the housing's substantially teardrop shape and length allows the housing (11) to turn inside the tee fitting (91) and thereafter maneuver past the tee fitting (91). Due to the substantially teardrop shape, the housing's length may be larger than the maximum or minimum interior diameter of the tee fitting (91), however, too large of a length in proportional relationship to the maximum or minimum interior diameter of the "T" section may result in the housing being unable to maneuver past the tee fitting (91). In addition to pressure related forces, viscous forces may play a significant role in propelling the inspection device (10) through the interconnected pipes (26). Still another contributing factor associated with propelling the inspection device (10) is the weight of the inspection device. The weight and associated gravitational effects may help to propel the inspection device (10) in regions of the plurality of interconnected pipes where there is a descending downstream component in the inspection device's movement. Wherein the weight and associated gravitational effects help propel the inspection device (10), the inspection device (10) is negatively buoyant. Depending upon the mixture of fluids interacting with the inspection device (10) and the mass of the inspection device (10), which may be controlled with the addition of ballast, the inspection device (10) may be positively, negatively, or neutrally buoyant. A predetermined flow rate may in part determine the sufficient fluid force which is subsequently, in part, necessary to propel the inspection device (10) and attached tether line (61) through the plurality of interconnected pipes (26). Determination of the predetermined flow rate (83) can be achieved through the use of a predetermined theoretical model to determine the predetermined flow rate based on a predetermined force. Viscous drag may be incorporated in the theoretical model used to compare flow rate and force. Incorporation of viscous drag requires empirical data such as "friction factor" and depends, in part, upon the surface texture of the housing (11). Further, the predetermined second fluid (49) may be selected based on its density and/or viscosity in relative comparison to the first fluid's (48) density and/or viscosity, thereby affecting the hydrokinetic effects imparted on the inspection device (10) and in the fluid environment in close proximate relation with the inspection device (10). In effect, the method in its various embodiments described above can be designated as a form of "passive propulsion" in the sense that there are no active propulsive components on the inspection device (10) itself. Active propulsive components include, for example, a means to the grip the interior of one or more pipes and using powered actuators to propel a device; a means for pushing or pulling the device such as a pipe crawler; or the use of one or more impellers oriented for horizontal and/or vertical thrust (just to name a few examples). Active propulsive components are not used in this invention. In an embodiment, the tether line (61) may be braked upon reaching a hold point or the inspection device's final destination. The tether line (61) may also be retracted and thereafter unwound in one or more cycles for purposes of maneuvering around an obstacle or obstruction. In combination with braking the tether line (61), the fluid injection system (41) may decrease or suspend the flow of the predetermined second fluid (49).

Upon reaching its final destination, the inspection device (10) may activate its one or more sensors (21) and perform inspection operations. In an embodiment, the final destination may be a large storage tank or cell (27). In this embodiment, the inspection device (10) enters the top or side of the cell (27) through the plurality of interconnected pipes (26). In an embodiment, the one or more sensors (21) comprise a two-dimensional sonar (23) whereby the sonar is activated and is used to profile and map the interior space of the cell (27) or ascertain the cell's (27) volumetric content of any sediment at the bottom of the cell (27). The integrated stepper motor (24) is commanded utilizing the software's (100) graphical user interface (104) to rotate the sonar (23) about the longitudinal axis of the inspection device (10) through a predetermined sweep angle. As discussed supra, the inspection device (10) is designed to be modular. In another embodiment, the one or more sensors (21) comprise a sample collector, a retrieval unit, or both which may be utilized to collect and return a sample of (for example) sediment at the bottom of the cell (27) or attic oil at the top of the cell (27). In an embodiment, the housing (11) can be disassembled and a first sensor may be changed out with a second sensor. In another embodiment, the housing (11) can be disassembled and any combination of the housing's (11) main body (13), aft section (14), and cap (15) can be changed out for another main body (13), aft section (14), and cap (15) or removed. In an embodiment wherein the one or more sensors (21) comprise a sonar (23) and the sonar (23) comprises a two-dimensional sonar, the software's (100) processor application (103) may be used to convert the data from the two-dimensional sonar into a three-dimensional profile of the interior space of the cell (27). Upon command from the one or more users, the inspection device (10) may be retrieved. In an embodiment, the tether line (61) is retrieved into the spool (62) thereby retrieving the inspection device (10) into the stowage and launching compartment (30).

While specific embodiments have been shown and described, it is to be understood that numerous changes and modification may be made without departing from the scope and spirit of the invention.

What is claimed is:

1. A method for moving a device inside one or more pipes comprised of one or more tee-fittings, the method comprising the steps of:

providing the one or more pipes comprised of the one or more tee-fittings having a predetermined minimum interior diameter and one or more interior diameters, wherein each of the one or more tee-fittings is comprised of a first and second section configured at substantially a right angle in relationship to each other forming two 90 degree turns;

providing the device comprised of a housing having a maximum outer diameter and a forward section, wherein the housing's maximum outer diameter is less than the one or more pipes' predetermined minimum interior diameter and one or more interior diameters, wherein the housing's maximum outer diameter is in a predetermined proportional relationship with the one or more pipes' predetermined minimum interior diameter and one or more interior diameters, and wherein the housing is substantially teardrop in shape;

injecting a fluid into the one or more pipes at a predetermined flow rate thereby creating a fluid flow, wherein the predetermined flow rate is capable of effectively applying a predetermined force on the device;

deploying the device inside the one or more pipes; and invoking a pressure differential of predetermined value between a first pressure upstream of the device and second pressure downstream of the device wherein the first pressure is greater than the second pressure and wherein the step of invoking the pressure differential is accomplished through a combination of the predetermined proportional relationship, the predetermined flow rate, and the housing's substantially teardrop shape thereby permitting the fluid to flow around the device's exterior at a predetermined second velocity and to flow downstream of the device subsequently decreasing the second pressure, wherein the combination of the pressure differential and predetermined force results in moving the device inside the one or more pipes and through at least one 90 degree turn formed by the one or more tee-fittings.

2. The method of claim 1, wherein the step of providing one or more pipes comprises a plurality of interconnected pipes and wherein the plurality of interconnected pipes is partially filled with a first fluid, wherein the fluid is a predetermined second fluid, and wherein the step of invoking a pressure differential includes permitting a mixture of the first and second fluids to flow around the housing.

3. The method of claim 2, wherein the first and second fluids have substantially the same composition.

4. The method of claim 1, wherein the device is further comprised of one or more sensors and wherein the one or more pipes has an entrance end and an exit end and further comprising the steps of:

providing a tank accessible from the one or more pipes' exit end wherein the tank is at least partially filled with a first fluid, a third fluid, or both;

entering the tank by the device from the one or more pipes; and using the one or more sensors to inspect the interior of the tank.

5. The method of claim 4, providing a tether line connected to the device wherein the tether line is in operable connectivity with the one or more sensors;

transmitting power and digital data to and from the one or more sensors via the tether line; and retrieving the device by retracting the tether line.

6. The method of claim 1, further comprising the steps of:

determining the predetermined force; and using a predetermined theoretical model to determine the predetermined flow rate based on the predetermined force.

7. The method of claim 1, further comprising the steps of:

providing a tether line connected to the device; and retrieving the device by retracting the tether line.

8. The method of claim 7, further comprising the step of:

unwinding and winding the tether line as necessary when the device's housing enters at least one of the one or more tee-fittings, and wherein the combination of the pressure differential, predetermined force, housing's substantially teardrop shape, and the step of unwinding and winding results in moving the device through the at least one of the one or more tee-fittings.

\* \* \* \* \*